United States Patent
Wu et al.

(10) Patent No.: US 8,228,910 B2
(45) Date of Patent: Jul. 24, 2012

(54) AGGREGATING NETWORK PACKETS FOR TRANSMISSION TO A DESTINATION NODE

(75) Inventors: Zong Liang Wu, San Diego, CA (US); Ronald Lee, San Diego, CA (US); Abul Safdar, San Diego, CA (US); Glenn Delucio, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 453 days.

(21) Appl. No.: 12/117,890

(22) Filed: May 9, 2008

(65) Prior Publication Data

US 2008/0279219 A1    Nov. 13, 2008

Related U.S. Application Data

(60) Provisional application No. 60/917,062, filed on May 9, 2007.

(51) Int. Cl.
*H04L 12/28* (2006.01)
*H04L 12/56* (2006.01)
(52) U.S. Cl. .................................................. 370/389
(58) Field of Classification Search ............... 370/389, 370/392, 394, 32, 469, 535; 709/203, 208
See application file for complete search history.

(56) References Cited

U.S. PATENT DOCUMENTS

| | | | |
|---|---|---|---|
| 4,630,262 A * | 12/1986 | Callens et al. | 370/435 |
| 7,170,893 B2 * | 1/2007 | Rajan et al. | 370/393 |
| 7,336,607 B2 | 2/2008 | Samadi et al. | |
| 7,586,948 B2 * | 9/2009 | Hiddink et al. | 370/473 |
| 7,688,857 B2 * | 3/2010 | Jang et al. | 370/469 |
| 7,697,522 B2 * | 4/2010 | Kliger et al. | 370/389 |
| 2002/0196787 A1 | 12/2002 | Rajan et al. | |
| 2004/0151206 A1 * | 8/2004 | Scholte | 370/473 |
| 2004/0179475 A1 | 9/2004 | Hwang et al. | |
| 2005/0041688 A1 | 2/2005 | Bernhard et al. | |
| 2005/0157715 A1 | 7/2005 | Hiddink et al. | |
| 2006/0029099 A1 | 2/2006 | Jang et al. | |
| 2007/0299987 A1 | 12/2007 | Parker et al. | |

OTHER PUBLICATIONS

Specification of U.S. Appl. No. 60/907,111, filed Mar. 21, 2007, as it relates to U.S. Pat No. 7,697,522.*
International Search Report PCT/US2008/063231, May 9, 2008.
Written Opinion PCT/US2008/063231, May 9, 2008.

* cited by examiner

*Primary Examiner* — Ayaz Sheikh
*Assistant Examiner* — Blanche Wong
(74) *Attorney, Agent, or Firm* — James Sze; Duane Morris LLP

(57) ABSTRACT

A node for transmitting digital data over a network receives a plurality of packet data units and identifies at least two of the packet data units that have the same aggregation identifier. The node then forms an aggregate packet from the packet data units that have the same aggregation identifier and transmits the aggregate packet to a common destination node or nodes.

3 Claims, 5 Drawing Sheets

AGGREGATING NETWORK PACKETS FOR TRANSMISSION TO A DESTINATION NODE

RELATED APPLICATIONS

This application claims the benefit of U.S. Provisional Application No. 60/917,062, filed May 9, 2007, the specification of which is herein incorporated by reference.

FIELD

This disclosure is directed generally to a communication network, and in particular to data packet transmission in a communication network.

BACKGROUND INFORMATION

In some networking environments, communication networks may be formed when multiple interoperable nodes communicating over a shared medium detect the existence of other nodes. One example of such a network is a network that operates in accordance to the Media over Coax Alliance ("MoCA") MAC/PHY Specification v. 1.0. In this network, nodes may function as "clients" or "slave" nodes, or as "master"/"network controller"/"network coordinator" ("NC") nodes. A network will typically have a single NC node and any number of client nodes, and the NC node may transmit beacons and other control information to manage the network.

In some networks, such as an MoCA network or an Ethernet-based network, digital data is transmitted in the form of a packet. However, overhead information is associated with each packet transmitted through the network. The overhead information, including identifiers, source and destination addresses, error control fields, etc., is added to the user data and reduces the availability of network bandwidth for user data.

SUMMARY

One embodiment is a node for transmitting digital data over a network. The node receives a plurality of packet data units and identifies at least two of the packet data units that have the same aggregation identifier. The node then forms an aggregate packet from the packet data units that have the same aggregation identifier and transmits the aggregate packet to a common destination node or nodes.

DETAILED DESCRIPTION

One embodiment is a network in which a transmitting node aggregates packets that are directed to a common destination node. The transmitted packet overhead of the network can then be reduced by eliminating interframe gaps, preamble information, and extra headers.

Figure 1:
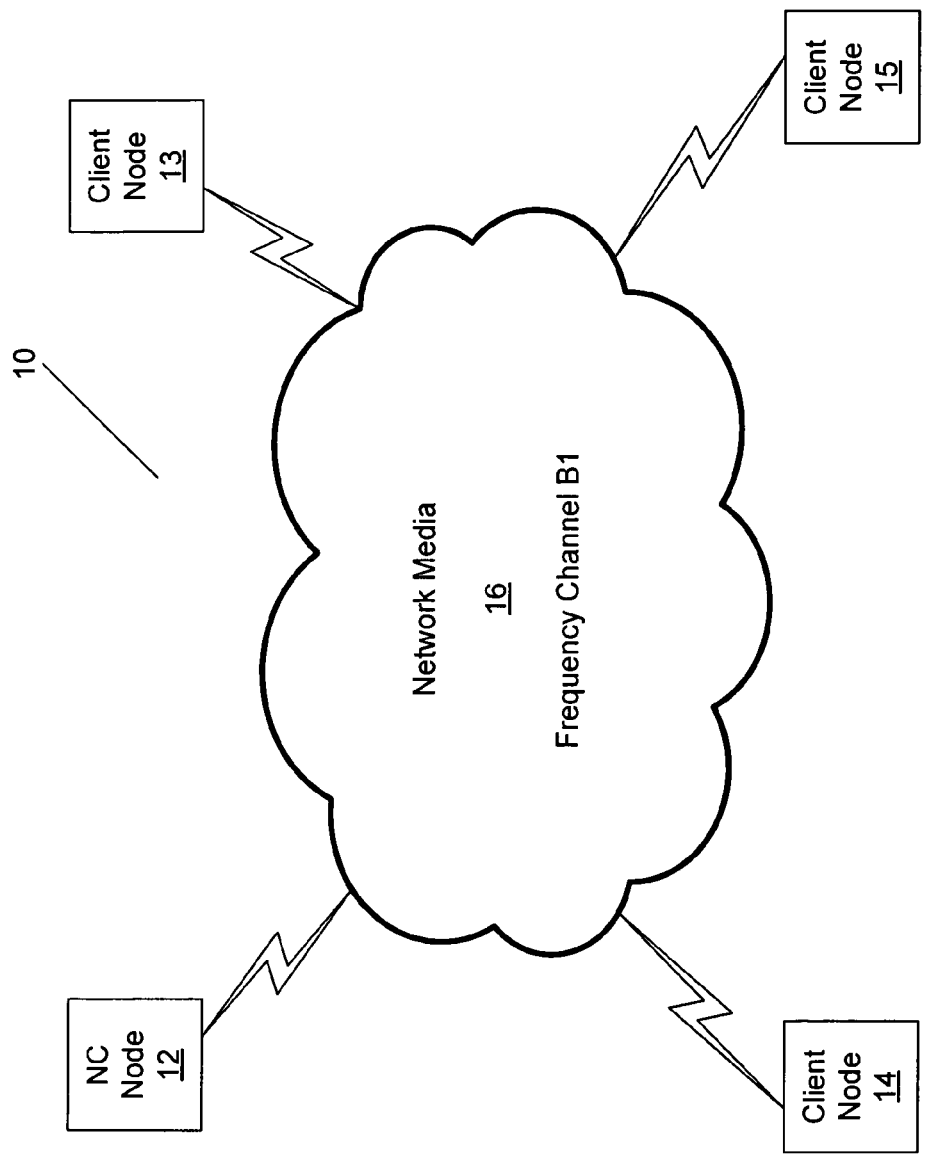
FIG. 1 is a block diagram of a network in accordance with one embodiment.

FIG. 1 is a block diagram of a network 10 in accordance with one embodiment. Network 10 includes an NC node 12 and client nodes 13-15. In one embodiment, network 10 is a network in a home environment, and nodes 12-15 are integrated with or coupled to devices in a home that communicate digital data in the form of messages between each other. Examples of such devices include set-top boxes, digital video recorders ("DVR"s), computers, televisions, routers, etc. Nodes 12-15 are coupled to a network media 16 that provides the media over which the digital data is transferred. In one embodiment, network media 16 is coaxial cable. However, network media 16 may be any other type of media, including other wired media or wireless media. In one embodiment, network 10 is a full mesh network so that any node on the network can communicate directly with any of the other nodes on the network in any direction. In one embodiment, network 10 may include up to 16 nodes.

In one embodiment, network 10 is formed by a node that scans a list of frequency channels to search for an existing network. If an existing network is found, the node will join that network as a client node. If no existing networks are found, the node will start a new network, such as network 10, as an NC node, and client nodes will join the new network. In one embodiment, network 10 operates as a network within the allowable frequencies of Media over Coax Alliance MAC/PHY Specification v. 1.0 (hereinafter, "MoCA 1.0"). The range of frequencies in MoCA 1.0 is 875-1500 MHz, and frequency channels exists at intervals of either 25 MHz or 50 MHz. Therefore, there is a frequency channel having a center frequency at 875 MHz, another at 900 MHz, another at 925 MHz, and so on through 1000 MHz, and then skipping to 1150 MHz with channels at 50 MHz intervals from there up to 1500 MHz with a channel centered at 1150 MHz, 1200 MHz, etc., up to 1500 MHz. In the example of FIG. 1, network 10 operates at frequency channel B1 (e.g., 900 MHz), while another network having an NC node and multiple client nodes may operate at frequency channel D 2 (e.g., 1200 MHz) or any other available frequency channel.

In one embodiment, when network 10 is initially formed or when new client nodes are admitted, a link maintenance operation ("LMO") is performed from each node to every other node of the network. The LMO is controlled by the NC node, which specifies which node is to perform the LMO. An LMO in general involves transmitting probe messages formed using a predetermined bit sequence and length from one node to another node to estimate the channel characteristics between the nodes. The receiving node processes the probe messages as received and determines the impairment present between the transmitter and receiver. Based on the measured impairment of the channel, the modulation between transmitter and receiver is adapted. In one embodiment, bitloading is used to adapt the modulation. Bitloading is a method of allocating a higher order signal constellation to carriers that have higher signal-to-noise ratio and a lower order constellation to carriers that have lower signal-to-noise ratio. In one embodiment, the node's greatest common denominator ("GCD") modulation profile may then be calculated based on the individual point-to-point LMO results and in another embodiment, GCD probes may be sent to determine the GCD modulation profile.

In one embodiment, network 10 transmits digital data between nodes using Orthogonal frequency-division multiplexing ("OFDM") modulation. In this embodiment, digital data communicated over the link is sent on each of 256 carriers modulated to carry information and all carriers are transmitted to the same recipient in parallel on different frequencies. Therefore, network 10 includes 256 carriers, of which 224 are typically used to carry content in one embodiment. Each of the 224 content carrying carriers is modulated using Binary Phase-Shift Keying ("BPSK"), Quadrature Phase-Shift Keying ("QPSK"), or other Quadrature Amplitude Modulation ("QAM") in one embodiment.

Figure 2:
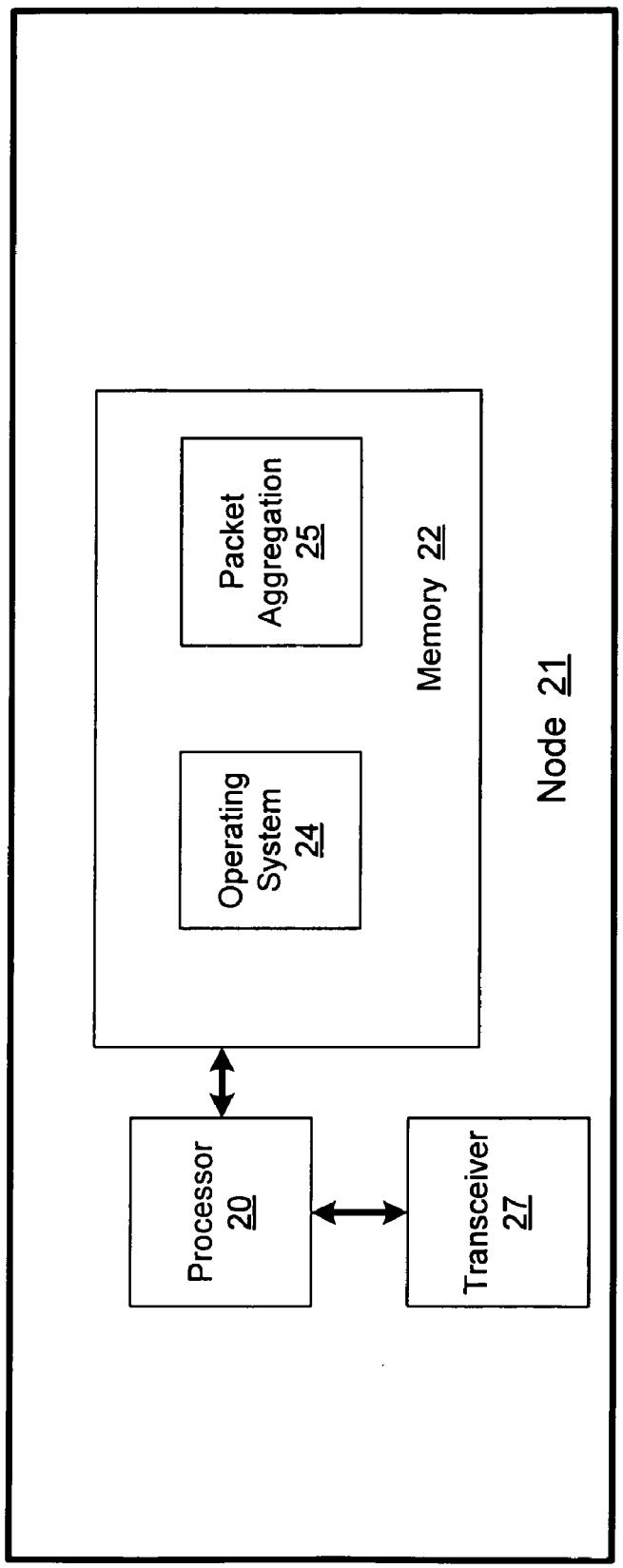
FIG. 2 is a block diagram of a node in accordance with one embodiment.

FIG. 2 is a block diagram of a node 21 in accordance with one embodiment. Node 21 can function as an NC node, such as node 12 of FIG. 1, or as a client node, such as nodes 13-15 of FIG. 1. Node 21 includes a processor 20, a transceiver 27, and memory 22. Processor 20 may be any type of general or specific purpose processor. Transceiver 27 can be any device that transmits and receives digital data. Memory 22 stores information and instructions to be executed by processor 20. Memory 22 can be comprised of any combination of random access memory ("RAM"), read only memory ("ROM"), static storage such as a magnetic or optical disk, or any other type of computer readable medium.

Computer readable medium may be any available media that can be accessed by processor 20 and includes both volatile and nonvolatile media, removable and non-removable media, and communication media. Communication media may include computer readable instructions, data structures, program modules or other data in a modulated data signal such as a carrier wave, or other transport mechanism, and includes any information delivery media.

In one embodiment, memory 22 stores software modules that provide functionality when executed by processor 20. The modules include an operating system 24, and a packet aggregation module 25. The functionality of these modules, although shown as software in FIG. 2, can be implemented by any combination of hardware or software in other embodiments.

In one embodiment, operating system 24 provides the functionality that allows processor 20 to operate node 21, including controlling transceiver 27 and memory 22. In one embodiment, packet aggregation module 25 aggregates packets that are to be transmitted to the same destination node, as disclosed below.

Figure 3:
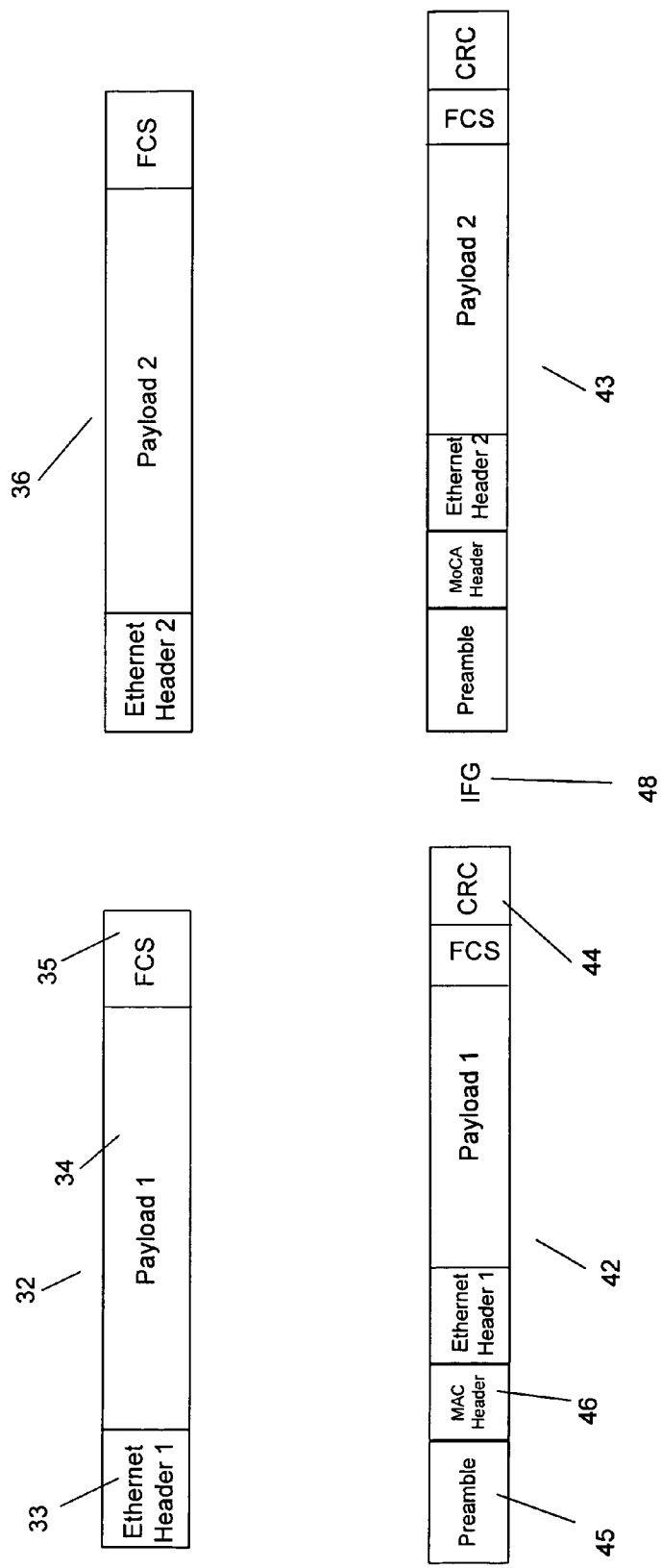
FIG. 3 illustrates the structure of various packets that are received and/or transmitted by the network in accordance to one embodiment.

In one embodiment, the digital data that is transmitted among nodes in network 10 is originally received by network 10 at one of the nodes in the form of Ethernet packets, or "packet data units" ("PDUs") and then converted to MoCA packets before being transmitted to other nodes of network 10. FIG. 3 illustrates the structure of various packets that are received and/or transmitted by network 10 in accordance to one embodiment. An Ethernet packet, such as Ethernet packets 32 and 36, typically includes at least an Ethernet header 33, a payload 34 and Frame Check Sequence ("FCS") bits 35 (also referred to as cyclic redundancy check ("CRC") bits). In MoCA networks, each Ethernet packet must be converted to a MoCA packet before being sent to a destination node in the network. A MoCA packet, such as MoCA packets 42 and 43, include the data from the Ethernet packet (i.e., the entire Ethernet packet, including header 33 and FCS 35), as well as a preamble 45, a MoCA MAC header 46, which provides the destination address of the packet, and a MoCA Media Access Control ("MAC") CRC 44. Therefore, in a MoCA network, in order to transmit Ethernet packets 32 and 36, each packet will be converted to a MoCA packet (such as packets 42 and 43), and each MoCA packet will be transmitted separately to a destination node, even if both packets go to the same destination node or nodes. In addition, the transmitting node will have to request a time slot for transmission for each packet through a Media Access Plan ("MAP") message, and an Interframe Gap ("IFG") 48 must be inserted between the transmission of each frame. The MAP is a message sent by the NC node to client nodes to define assignments of nodes to time slots and announces the schedule of upcoming transmissions.

Figure 4:
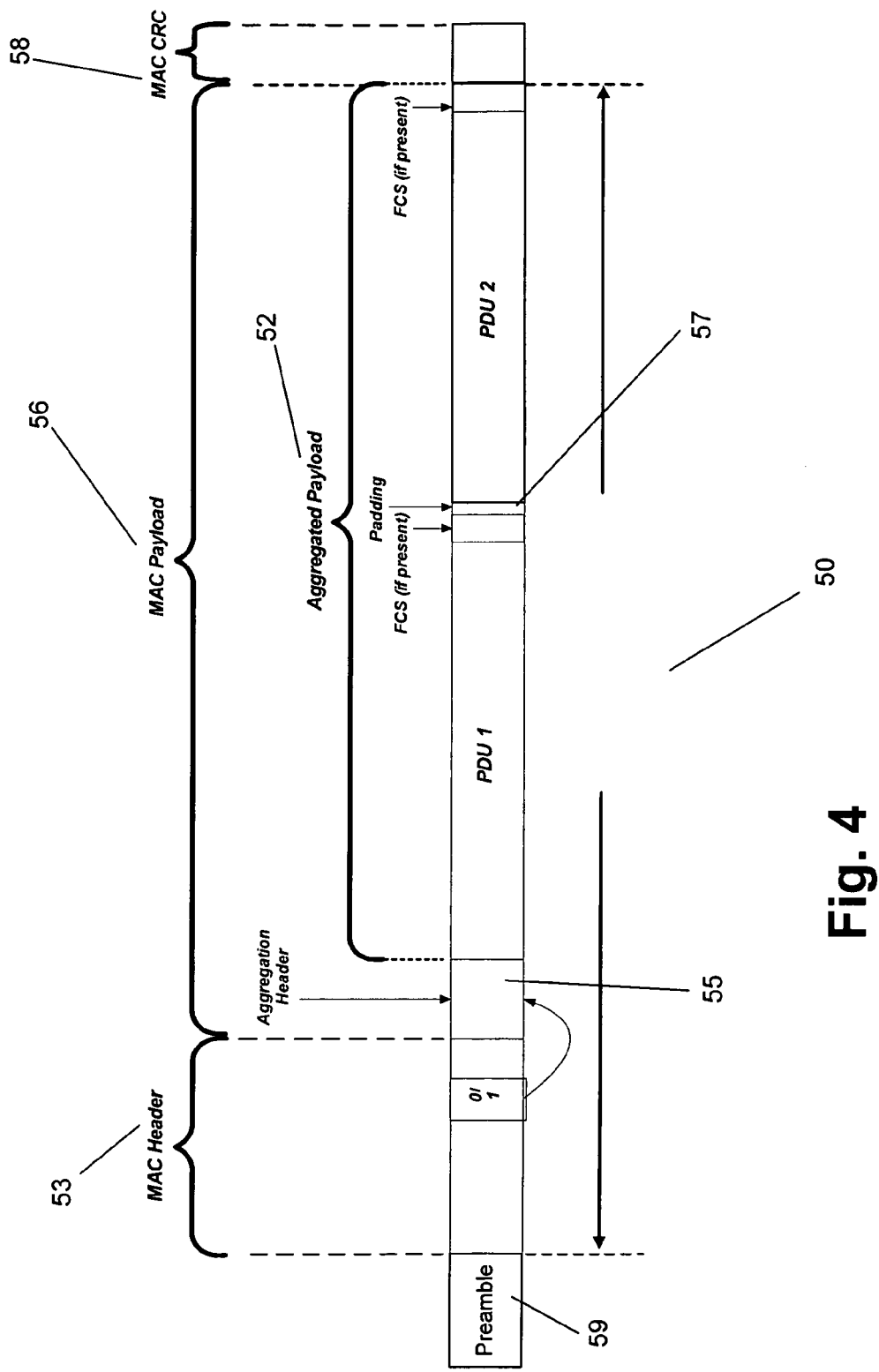
FIG. 4 illustrates the structure of an aggregated frame in accordance with one embodiment.

In contrast to sending two or more separate MoCA packets to the same destination node, in one embodiment packet aggregation module 25 of node 21 aggregates Ethernet frames 32 and 36 into a single aggregated frame 50 when it is determined that frames 32 and 36 are to be transmitted to the same destination node or nodes or have the same aggregation ID. FIG. 4 illustrates the structure of aggregated frame 50 in accordance with one embodiment. Aggregated frame 50 includes a MAC payload 56, which includes an aggregated payload 52 that is formed from the data from Ethernet frames 32 and 36, and padding 57. MAC payload 56 further includes an aggregation header 55. Aggregation frame 50 further includes a MAC header 53, a preamble 59, and a MAC CRC 58.

In one embodiment, MAC header 53 includes an aggregation control field. The aggregation control field indicates to the receiving node that aggregation control is supported. The format of the aggregation control field in accordance with one embodiment, shown in Table 1 below, includes a 32 bit field in which 28 bits are reserved and 4 bits indicate the types of aggregation control support.

TABLE 1

| Field | Length | Usage |
| --- | --- | --- |
| AGGREGATION CONTROL | 32 bits | Indicate if aggregation control is supported as follows:<br>Bits 31:3 - Reserved<br>Bit 3 - Set to '1' if Aggregation header is inserted<br>Bit 2 - reserved, Type III<br>Bit 1 - set to '1' if Aggregation header checksum is enabled<br>Bit 0 - set to '1' if original FCS of each PDU is included |

The format of aggregation header 55 in accordance with one embodiment is shown in Table 2 below.

TABLE 2

| Parameter Name | Length | Description |
| --- | --- | --- |
| RESERVED | 16 bits | Type II |
| NPDU | 16 bits | Number of PDUs in this frame |
| PDU0_LEN | 16 bits | PDU 0 payload size without padding (in bytes) |
| PDU1_LEN | 16 bits | PDU 1 payload size without padding (in bytes) |
| ... | 16 bits | |
| PDUN1_LEN | 16 bits | PDU (N-1) payload without padding size (in bytes) |
| PDUN_LEN | 16 bits | PDU N payload size without padding (in bytes) |
| FCS | 16 bits | Frame Check Sequence, Aggregation header checksum |
| RESERVED | 16 bits | Type III |

As shown, aggregation header 55 in one embodiment includes the total number of PDUs to be aggregated and the length of each PDU. In one embodiment, the maximum length of aggregate packet 50 is 8192 bytes and each PDU is padded to the nearest PDU length, which is a multiple of 4 bytes. In addition, 16 bits of padding are added to aggregation header 55 if it is not a multiple of 4 bytes. The maximum number of packets to be aggregated is independent of the packet size and the aggregation checksum is used if it is enabled in the aggregation control field in MoCA MAC header 53.

In one embodiment, the aggregated payload consists of multiple Packet PDUs, where the maximum payload of each PDU is 1518 bytes. Link control, probes, and any MAC layer management packets are not aggregated. Aggregated packets with different aggregation identifiers ("IDs") may be transmitted out-of-order. However, PDUs with the same aggregation ID should be transmitted in order. In one embodiment, an aggregation ID is a packet classifier that classifies packets into different categories according to their properties/attributes, such as destination address(es), priority etc. One example is to aggregate all packets going to the same destination (unicast) or the same group of destinations (multicast or broadcast). Another example is to aggregate all packets going to the same destination (unicast) or the same group of destinations (multicast or broadcast) and with the same priority, so that packet aggregation and Quality of Service can be supported simultaneously. One node may support one or multiple aggregation IDs. In a network there may be one or multiple aggregation IDs being used.

In one embodiment, an additional packet sequence number field, as shown in Table 3 below, can be added to the packet aggregate header format or the MAC header to indicate a sequence number for the individual packets or aggregated packets. Individual or aggregated packets can be assigned a unique sequence number to facilitate detection of missing packets and proper ordering of packets if the packets are received out of order. Missing packets can be identified and requested for retransmission.

TABLE 3

| Parameter Name | Length | Description |
| --- | --- | --- |
| PACKET SEQ NUMBER | 16 bits | Packet Sequence number |

Figure 5:
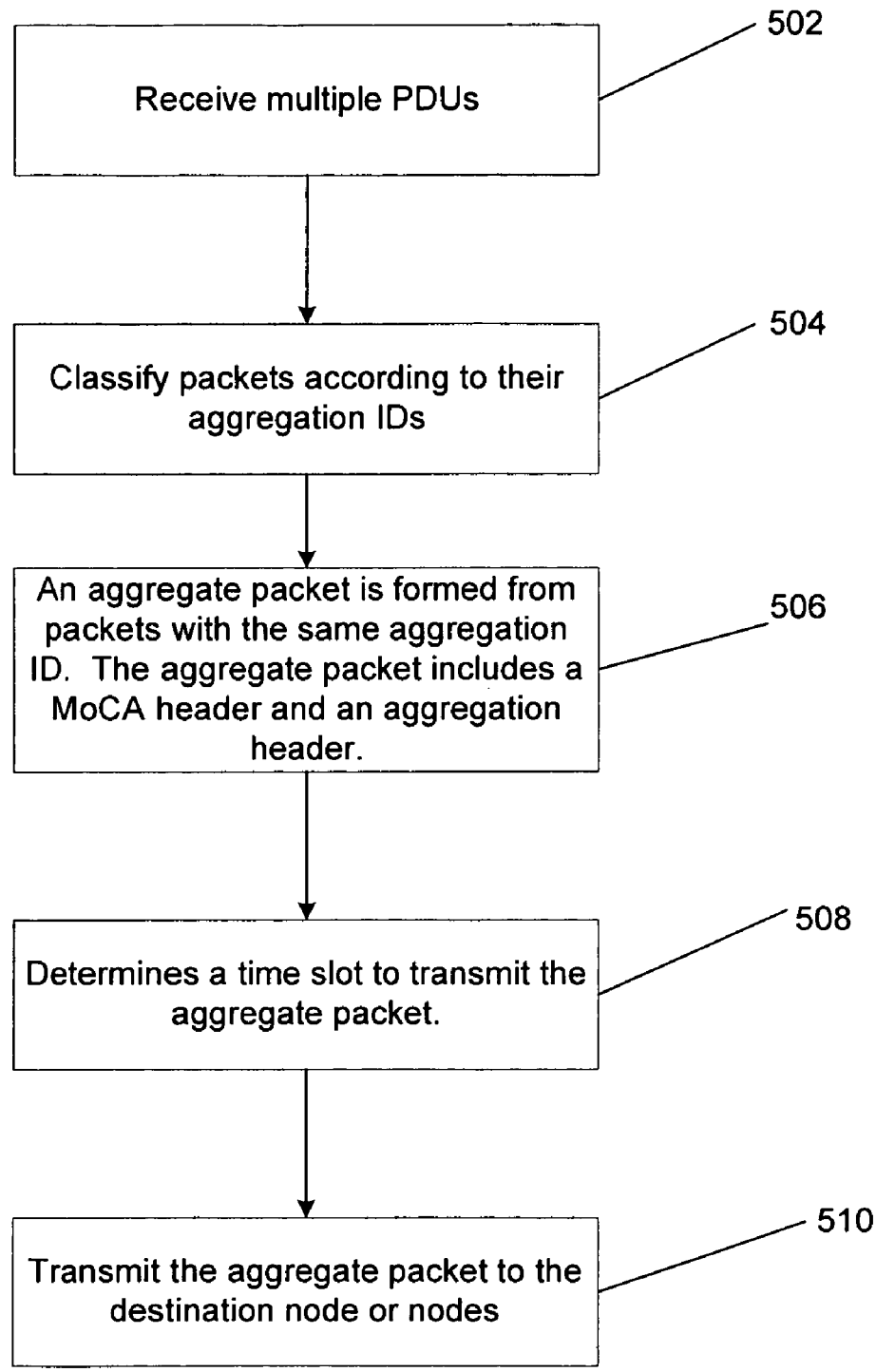
FIG. 5 is a flow diagram of the functionality of the node of FIG. 2 in accordance with one embodiment when aggregating packets.

FIG. 5 is a flow diagram of the functionality of node 21 of FIG. 2 in accordance with one embodiment when aggregating packets. In one embodiment, the functionality of the flow diagram of FIG. 5 is implemented by software, stored in memory or other computer readable or tangible medium, such as packet aggregation module 25, and executed by a processor. In other embodiments, the functionality can be performed by hardware, or any combination of hardware and software.

At 502, node 21 receives multiple Ethernet packets or PDUs. Each PDU includes a header which indicates its destination node within the network and includes an aggregation ID. In other embodiment, any type of data packet can be received as the PDUs.

At 504, node 21 classifies packets according to their aggregation IDs, so that only packets with the same aggregation IDs are aggregated for transmission. The aggregation ID may be any combination of destination address or addresses, and priority for prioritized traffic and flow ID for parameterized quality of service ("QoS") traffic.

At 506, an aggregate packet is formed from the packets with the same aggregation IDs. The aggregate packet includes a MoCA MAC header and an aggregation header.

At 508, through MAP messages, node 21 determines a time slot to transmit the aggregate packet. In one embodiment, a reservation request is sent to the NC node to allocate a time slot corresponding to the actual size of the aggregated packet.

At 510, the aggregate packet is transmitted to the destination node or nodes if multicasted. The destination node, when it receives the packet, disassembles aggregated packets into individual PDUs.

In general, larger packets may generate a larger number of errors due to various noise and interference within the network. When packet aggregation errors occur, the following rules are employed in one embodiment at the receiving node:

1. When a receiving node sees a "aggregation header checksum" bit enabled in the MAC header, it calculates the checksum of received aggregation header and compares it to the value of checksum in the received header. If the checksums do not match, the packet is dropped.
2. When a receiving node sees the "original FCS for each PDU included" bit set in the MAC header, the Frame Check Sequence ("FCS") is not modified while passing the PDUs to a host, but the original FCS is preserved. This allows the host data driver to determine which of the PDUs are corrupted instead of dropping the entire set of aggregated packets.

These rules, by using the FCS of the original PDUs and the Aggregate Header Checksum, effectively reduce the packet error rate of original individual PDUs.

In one embodiment, a node has an aggregation capability bit that can be enabled to indicate that the node can aggregate PDUs. After the node is admitted to the network, the NC node broadcasts the newly admitted node's capabilities to the other nodes in the network.

As disclosed, a node within a network may aggregate two or more packets that have the same aggregation ID. The aggregation reduces network overhead.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of transmitting digital data over a network comprising:
   receiving a plurality of packet data units;
   identifying at least two of the plurality of packet data units that have a same aggregation identifier;
   forming an aggregate packet from the at least two of the plurality of packet data units; and
   transmitting the aggregate packet to at least one destination node;
   wherein the aggregate packet comprises an aggregation header that comprises a number of packet data units in the aggregate packet,
   further comprising:
   determining the presence of a checksum bit in a media access control header;
   calculating a first checksum for the aggregation header;
   comparing the first checksum to a second checksum that is received in the aggregation header of the aggregate packet;
   receiving the aggregate packet, wherein the aggregate packet comprises the media access control header;
   determining the presence of an original frame check sequence bit in the media access control header; and
   passing the at least two of the plurality of packet data units to a device without modifying frame check sequences if the second checksum is found to be correct.

2. A non-transitory computer readable media having instructions stored thereon that, when executed by a processor, causes the processor to transmit digital data over a network, the processor comprising:
   receiving a plurality of packet data units;
   identifying at least two of the plurality of packet data units that have a same aggregation identifier;

forming an aggregate packet from the at least two of the plurality of packet data units;
transmitting the aggregate packet to at least one destination node
wherein the aggregate packet comprises an aggregation header that comprises a number of packet data units in the aggregate packet;
receiving the aggregate packet, wherein the aggregate packet comprises a media access control header;
determining the presence of a checksum bit in the media access control header;
calculating a first checksum for the aggregation header;
comparing the first checksum to a second checksum that is received in the aggregation header of the aggregate packet;
receiving the aggregate packet, wherein the aggregate packet comprises a media access control header;
determining the presence of an original frame check sequence bit in the media access control header; and
passing the at least two of the plurality of packet data units to a device without modifying frame check sequences if the second checksum is found to be correct.

3. A system for transmitting digital data over a network comprising:
a transceiver adapted to receive a plurality of packet data units; and
a packet aggregation module for identifying at least two of the plurality of packet data units that have a same destination node and for forming an aggregate packet from the at least two of the plurality of packet data units;
wherein the transceiver is adapted to transmit the aggregate packet to at least one destination node; and
wherein the packet aggregation module identifies the same destination node by identifying a same aggregation identifier.

* * * * *